United States Patent Office 3,071,450
Patented Jan. 1, 1963

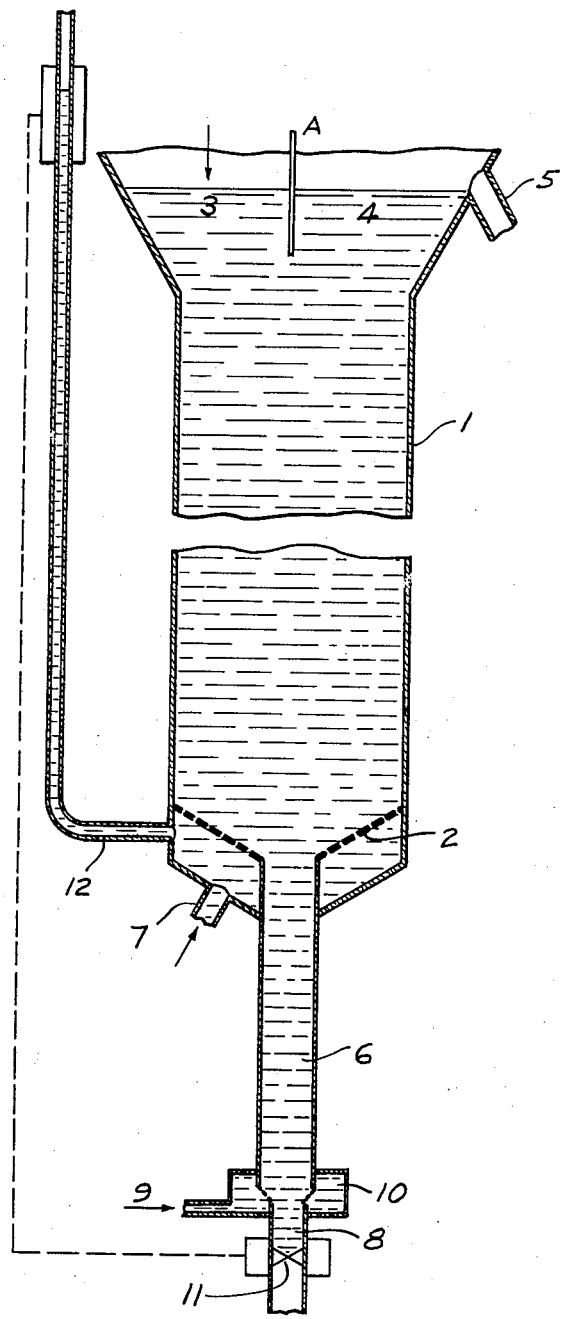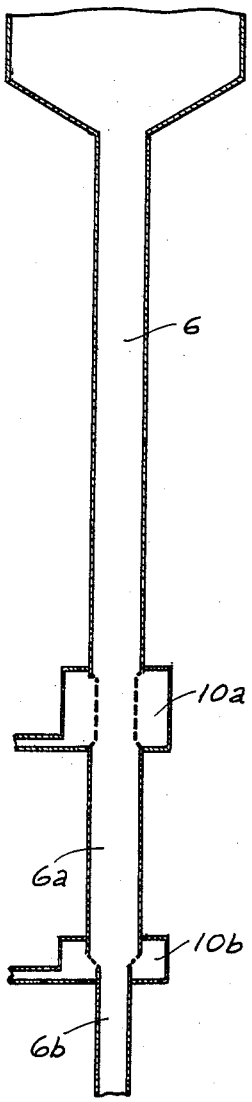

---

3,071,450
METHOD FOR THE TREATMENT OF POTASSIUM ORES
Jean Martin, Toul, France, assignor to Société a Responsabilité Limitée dite: Société d'Etudes Chimiques pour l'Industrie et l'Agriculture, Paris, France, a French company
Filed Apr. 1, 1960, Ser. No. 19,423
8 Claims. (Cl. 23—310)

This invention relates to the treatment of potassium ores, such as sylvinite, for the separation of crystallized potassium chloride therefrom. Such ores are usually treated by reacting the ore in crushed or ground form with a heated mother liquor or leaching solution, then cooling the resulting brine to crystallize and separate the potassium chloride therefrom, while the residual mother liquor is used in a fresh dissolving step with a further batch of ore.

General objects of the invention are to provide process and apparatus for carrying out this method in a continuous, counterflow operation rather than batchwise.

The dissolver or batching units conventionally used for the treatment of the type just specified are either of the horizontal or the vertical types. The more widely used horizontal dissolver units are provided in the form of large tanks of considerable volume capacity and weight, but they have a comparatively very low output capacity. The output yield rate per hour of such units is low, because there ore has to remain for long periods of time in the units in order to produce an effective removal of the potassium chloride from the ore. Furthermore, such units require considerable energy outputs for pumping the materials therethrough and for maintaining in the solid-liquid mass a sufficient degree of agitation in order to dissolve the potassium chloride.

The vertical dissolver units which have been proposed heretofore have not met with any commercial success because they have been only adapted for batchwise, or semi-continuous operation, with the mother liquor circulated through a set of successive dissolver units. No successful continuous extraction process for potassium ores has been devised so far, as far as the applicant is aware.

It is, therefore, an important object of this invention to provide method and apparatus for the continuous treatment of potassium ores; another object is to provide such process and apparatus wherein the selective dissolution of the potassium chloride and the washing of the resulting chloride are carried out in a continuous manner within a single unit of apparatus of low overall dimensions and simplified construction. Another object is to provide such apparatus which will not require mechanical means of agitation therein. Another object is to provide such method and apparatus which will practically not require any expenditure of mechanical power as for pumping the materials and for agitating the reagent masses.

The above and further objects and advantages of the invention will appear as the disclosure proceeds.

According to my invention crude potassium ore is subjected to a continuous selective extracting operation with a current of heated mother liquor adapted to maintain the ore in a fluidized condition. This leaching step is followed by a washing of the solid impregnated with mother liquor, by means of a current of fresh water of washing solution.

The crushed ore is maintained in a dissolution zone in a turbulent, fluidized condition, by a rising current of heated mother liquor, which is adapted to act preferentially thereon to dissolve the potassium chloride in the ore. The KCl rich brine is discharged from the top of the apparatus. The rate of flow of the mother liquor is so controlled that the amount of fines carried off by the brine will be as low as practicable. With a selected rate of fluid flow, the amount of ore fed into the apparatus is so selected and controlled that the issuing brine will be saturated in KCl at the outlet of the dissolver unit. The mother liquor impregnated solids resulting from the dissolution step, drop by gravity into a bottom washing zone, where they are treated with a rising current of fresh water or a suitable washing solution, in order to displace the impregnating mother liquor. The rate of flow of the washing solution is selected and controlled so that the solids will be maintained within the washing zone in the form of fixed expanded bed or in the form of a quiescent fluidized bed. The exhausted residual KCl is discharged from the base of the washing zone.

The specified treatment can be applied to crude ores as obtained from a conventional crusher, such as crushed crude sylvinite which may still contain particles of more than 2 mm. diameter and wherein the granulometrical analysis may extend over a very wide range, as from 6 mm. to 0.05 mm. max. dia., for example. The presence of clays in the ore even in comparatively large proportions, does not impede performance of the process of the invention.

Some of the advantages of the invention over prior methods of potassium chloride extraction are given below.

Whereas the leaching and washing steps were conducted separately in conventional processes, both steps are herein performed in a single unit of apparatus of small size. The apparatus is, moreover, simplified owing to the absence of any agitator means since the turbulence of the fluidized materials is sufficient to provide all the agitation needed. Moreover, the flow of solids through the leaching apparatus is caused by gravity and does not require any expenditure of energy.

In another connection, the KCl rich brine, obtained by the method of the invention, contains much less insolubles than in conventional methods, especially those using horizontal dissolver tanks. The rate of settling of the insolubles is also substantially increased. The two factors just mentioned both contribute to the achievement of an efficient and quick separation, thereby greatly reducing the size of the necessary brine-settling tanks.

The "fluidized" condition of the solid particles makes for excellent contact between the ore and the mother liquor, thereby greatly increasing the rate of dissolution of the KCl.

Thus the invention achieves the following advantages, the accomplishment of which forms additional objects of the invention:

Improved exhaustion of potassium chloride from the crude salts and lower losses in the residue.

Greatly reduced time of dwell of the solids in the dissolver units, thereby correspondingly reducing the dimensions required for the apparatus for a given output capacity. The hourly yield factor is likewise greatly increased.

Apparatus for carrying out the method of the invention will now be described by way of non-restrictive examples with reference to the accompanying drawings, wherein:

FIGURE 1 diagrammatically illustrates one embodiment of the apparatus, and

FIGURE 2 is a larger scale view of the lower portion of the apparatus in a modified form.

The apparatus shown essentially comprises a vertical dissolver or leaching unit of cylindrical shape, adapted for counterflow circulation of the ore and the mother liquor therethrough. The dissolver unit 1 is provided with a flared funnel-like upper section adapted to have the ore fed into it, and provided with overflow outlet means 5 for the discharge of the brine therefrom. In the lower section of the unit there is provided a diffusor means 2 for the mother liquor and means for washing the liquor-impregnated solids.

The flared upper section of the unit is divided into two compartments, as by means of a metal partition plate A. One side 3 serves to feed the crude ore material into the unit as already stated while the other side 4 is for the discharge of the saturated brine through the overflow outlet 5.

The leached solids impregnated with mother liquor are drawn off from the base of the unit through a vertical pipe section 6 extending axially of the unit and having a reduced cross-sectional diameter. The top of this pipe projects into the dissolver unit and is connected with the side walls thereof through the tapered diffusor member 2, which may comprise a perforate metal place, or a wire gauze element or any equivalent perforate means, in the form of a cone frustum forming a relatively small angle relative to the horizontal plane.

The heated mother liquor is fed into the bottom of the unit through inlet 7 opening into the annular space defined between the base of the dissolver unit and the upper section of the washing column or pipe 6. The rising column of mother liquor maintains the ore particles in a fluidized state and keeps up a continual and efficient agitation therein.

The solids from the solution drop by gravity into the column 6 and are washed clean by the rising current of fresh water or solution. The washing solution is fed into the apparatus in a manner generally similar to that used for feeding the mother liquor. Thus, the washed residual solid is discharged axially of the column at 8, whereas the washing solution is introduced laterally at 9 and enters the column 6 through a second diffusor 10 generally similar to the diffusor 2.

If desired the washing solution may be fed into the apparatus through a plurality of diffusor means in cascade; thus FIG. 2 illustrates a washing column provided with two diffusor stages 10a and 10b one at the base of the washing column and the other surrounding the column at a point spaced above the first.

A thickening or settling zone may be provided at the outlet from the washing column for thickening the residue. This settling zone would be located beneath the lowermost diffusor and comprises a column 6b smaller in diameter than that of the washing column 6a (FIG. 2). The vertical length of this settling or thickening zone or section may be predetermined with regard to the desired consistency of the thickened residual product.

The residual product after washing and thickening if provided for, is drawn off in small quantities by means of a valve 11 of the quick-acting type. The valve is arranged to be opened rapidly so soon as the pressure drop through the unit, which tends to increase at a uniform rate owing to the continuous supply of solids, has reached a predetermined value corresponding to a given weight of fluidized solids. For this purpose the pressure drop is sensed by means of a liquid pressure gauge or the like, as shown at 12, located at the base of the dissolver unit and communicating with the atmosphere at its top. This pressure gauge continually senses the pressure of the mother liquor at the inlet 7 and controls the outlet valve 11 to open for effecting discharge of a predetermined quantity of the product when the pressure has reached a predetermined upper limit. This method of withdrawal has the advantage that the dissolver unit is continuously operated under substantially constant pressure-drop conditions.

Throughout the leaching step the unit should be heated by any suitable means, as by direct or indirect steam heating, in order to provide the necessary heat for the process. This heat supply is required for two purposes. First, the crude salt ore must be heated from the surrounding temperature to about 100° C. Second, heat has to be supplied to compensate for that which is taken up in the dissolution of the KCl.

The low-diameter cylindrical dissolver unit of the invention has a number of advantages over conventional apparatus from the standpoint of heat supply. For one thing it is easier to provide efficient thermal isolation therefor, thereby economizing on the heat expenditure. Moreover, heat control in operation is greatly facilitated. Thus, the operating temperature can readily be held at a point very close to the boiling points of the mother liquor and the brine (about 110° C.) thereby increasing the quantity of KCl that is dissolved in a given volume of mother liquor, and increasing the rate of dissolution of the KCl. A further advantage is that a highly uniform operating temperature is maintained throughout the apparatus owing to the excellent heat transfer characteristics of the unit.

The dissolver unit described hereinabove is controlled and operated by means of a number of accessory equipment which will now be summarily described although such equipment may be of a conventional, well-known kind.

A pre-heating tank may serve to heat the mother liquor to about 80° C. A circulating pump discharges the pre-heated mother liquor to a heater where the temperature thereof is raised from 80° to about 110° C. The rate of flow of the mother liquor may be indicated by any suitable rate-of-flow indicator device.

Feeder means are provided above the dissolver unit for feeding ore thereto.

The KCl-laden brine is discharged through the overflow outlet 5 as already stated, and is then stripped of any fines it may contain in suspension therein, by any suitable means. The KCl is separated from the brine by conventional cooling methods, and the resulting mother liquor is recycled.

It will be understood that the invention is not restricted to the forms of embodiment specifically illustrated and described since modifications may be made therein without departing from the spirit of the invention.

I claim:

1. In a method of treating potassium ore containing potassium chloride with a heating leaching fluid thereby leaching the potassium chloride constituent to obtain a potassium chloride-rich brine, cooling the said brine, separating the crystallized potassium chloride therefrom and recycling the potassium chloride-stripped brine as said leaching liquid, the improvement comprising: establishing a turbulent fluidized body of said ore by introducing said ore into an upwardly moving column of said leaching liquid then continuously:

(a) feeding said leachant into the bottom of the moving column, while (b) withdrawing the aforesaid brine from the head of the column, and (c) introducing said ore in the column, thereby to keep the ore within the column in a turbulent, fluidized and downwardly moving state, whereby the KCl content of the ore is leached out during the period between its introduction into the column and its arrival at the bottom of the column, collecting the leached ore in a collection zone underlying said column, and withdrawing the ore from said collection zone, the velocity of the moving column of leachant, and the rate of introduction of said ore, and the withdrawal of the material accumulating in said collection zone, being correlated to maintain the pressure within the column at a value requisite to keep the ore in the aforesaid turbulent, fluidized state during the downward movement of the ore through said moving column.

2. Method as defined in claim 1 wherein the ore reaching the collection zone is impregnated with mother liquor, continuously feeding a stream of a washing solution into the bottom of the collection zone and allowing said stream to move upwardly through the collection zone and to maintain the ore in the collection zone in the form of an expanded body.

3. Method as defined in claim 2 wherein the washed ore is intermittently removed from the bottom of the collection zone.

4. Method as defined in claim 2 including the step of controlling the removal of the washed ore in response to the pressure drop through the leaching zone.

5. Method as defined in claim 2 including the step of sensing the pressure drop through the fluidized body and removing a batch of the exhausted ore from the bottom of the collection zone when said pressure drop reaches a predetermined value so as to maintain the pressure drop within prescribed limits throughout the process.

6. Method as defined in claim 2 wherein the mass in the collection zone is kept in the form of a fixed expanded body.

7. Method as defined in claim 2 wherein the mass in the collection zone is maintained in the form of a quiescent fluidized body.

8. Method as defined in claim 1 including the step of allowing the leached ore to accumulate in the collection zone, feeding a current of washing solution into the bottom of the collection zone to rise upwardly therethrough and keep the ore in said collection zone in the form of an expanded body, allowing the washed ore to drop from the collection zone into a thickening zone where it is thickened, and removing the thickened mass from the base of said thickening zone.

References Cited in the file of this patent

UNITED STATES PATENTS

| | | |
|---|---|---|
| 1,114,018 | Moore | Oct. 20, 1914 |
| 2,381,965 | Berry | Aug. 14, 1945 |
| 2,669,379 | Luque | Jan. 11, 1955 |